United States Patent
Hathaway et al.

(10) Patent No.: US 8,914,581 B2
(45) Date of Patent: Dec. 16, 2014

(54) METHOD AND APPARATUS FOR ACCESSING CACHE MEMORY

(75) Inventors: Robert Hathaway, Sunnyvale, CA (US); Evan Gewirtz, San Ramon, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 642 days.

(21) Appl. No.: 12/784,276

(22) Filed: May 20, 2010

(65) Prior Publication Data

US 2011/0289257 A1    Nov. 24, 2011

(51) Int. Cl.
*G06F 12/12* (2006.01)
*G06F 12/08* (2006.01)

(52) U.S. Cl.
CPC ............ *G06F 12/0888* (2013.01); *G06F 12/12* (2013.01)
USPC .......................................................... 711/133

(58) Field of Classification Search
USPC .......................................................... 711/133
See application file for complete search history.

(56) References Cited

U.S. PATENT DOCUMENTS

| | | | |
|---|---|---|---|
| 6,918,020 B2* | 7/2005 | Cavallo et al. | 711/160 |
| 2006/0069876 A1* | 3/2006 | Bansal et al. | 711/134 |
| 2006/0112226 A1* | 5/2006 | Hady et al. | 711/130 |

OTHER PUBLICATIONS

Jim Handy, The Cache Memory Book, Academic Press,1998, second edition, pp. 50-51 and 67-68.*
Xiaowei Jiang et al., "CHOP: Adaptive Filter-Based DRAM Caching for CMP Server Platforms", Jan. 9, 2010, pp. 1-12, 2010 IEEE 16th International Symposium on High Performance Computer Architecture (HPCA), Piscataway, New Jersey.

* cited by examiner

*Primary Examiner* — Jared Rutz
(74) *Attorney, Agent, or Firm* — Blakely Sokoloff Taylor & Zafman LLP

(57) ABSTRACT

A request for reading data from a memory location of a main memory is received, the memory location being identified by a physical memory address. In response to the request, a cache memory is accessed based on the physical memory address to determine whether the cache memory contains the data being requested. The data associated with the request is returned from the cache memory without accessing the memory location if there is a cache hit. The data associated is returned from the main memory if there is a cache miss. In response to the cache miss, it is determined whether there have been a number of accesses within a predetermined period of time. A cache entry is allocated from the cache memory to cache the data if there have been a predetermined number of accesses within the predetermined period of time.

12 Claims, 7 Drawing Sheets

304

Increment a value of a first of a plurality of entries of a filter array, each of the plurality of entries currently associated with one or more recently accessed physical memory addresses, where the first entry is associated with the physical memory address.

FIG. 4

METHOD AND APPARATUS FOR ACCESSING CACHE MEMORY

FIELD OF THE INVENTION

Embodiments of the invention relate generally to the field of data processing systems; and more particularly, to methods for accessing cache memory.

BACKGROUND

Most modern processors use a cache memory (or hierarchy of cache memories) to reduce average access times to memory and improve overall system performance. Cache memories take advantage of the principle of locality which says that the data most recently used is very likely to be accessed again in the near future. Modern dynamic random access memory (DRAM) (e.g., double data rate, DDR2 or DDR3) has many timing constraints which can limit the performance of the memory device. In particular, the row cycle time (tRC) imposes a minimum time between consecutive activations of the same memory bank. This timing parameter is significant because it limits the maximum frequency with which a single piece of data can be accessed. Today's DDR3 devices have a tRC of approximately 45 nanoseconds (ns).

A cache memory is a component that improves performance by transparently storing data such that future requests for that data can be served faster. The data that is stored within a cache memory might be values that have been computed earlier or duplicates of original values that are stored elsewhere. If requested data is contained in the cache memory, this request can be served by simply reading the cache memory, which is comparably faster. Otherwise, the data has to be recomputed or fetched from its original storage location (e.g., main memory), which is comparably slower. Hence, the more requests can be served from the cache the better the overall system performance is.

To be cost efficient and to enable an efficient lookup of data, cache memories are comparably small. Nevertheless, cache memories have proven extremely effective in many areas of computing because access patterns in typical computer applications have locality of reference. References exhibit temporal locality if data is requested again that has been recently requested already. References exhibit spatial locality if data is requested that is physically stored close to data that has been requested already.

Typically, each location (also referred to as a cache entry) in a cache memory contains data (also referred to as a cache line). The size of the cache line is usually larger than the size of the usual access requested by an instruction. Each location in the cache memory also has an index, which is a unique number used to refer to that location. The index for a location in main memory is called an address. Each location in the cache memory has a tag that contains the index of the datum in main memory that has been cached.

When a processor needs to read or write a location in main memory, it first checks whether that memory location is in the cache. This is accomplished by comparing the address of the memory location to all tags in the cache that might contain that address. If the processor finds that the memory location is in the cache, a cache hit has occurred; otherwise, there is a cache miss. In the case of a cache hit, the processor immediately reads or writes the data in the cache line.

In the case of a miss, the cache memory allocates a new entry, which comprises the tag just missed and a copy of the data. The reference can then be applied to the new entry just as in the case of a hit. Read misses delay execution because they require data to be transferred from a much slower main memory than the cache memory itself. Write misses may occur without such penalty since the data can be copied in background.

In order to make room for the new entry on a cache miss, the cache has to evict one of the existing entries. The heuristic that it uses to choose the entry to evict is called a replacement policy. One popular replacement policy replaces the least recently used (LRU) entry.

A cache memory can be a direct-mapped, 2-way, 4-way, or full associative cache memory. Associativity is a trade-off. If there are ten places the replacement policy can put a new cache entry, then when the cache is checked for a hit, all ten places must be searched. Checking more places takes more power, chip area, and potentially time. On the other hand, cache memories with more associativity suffer fewer misses, so that the processor spends less time servicing those misses.

In order for a cache memory to be effective, the memory access pattern must exhibit locality. In computer science, locality of reference, also known as the principle of locality, is the phenomenon of the same value or related storage locations being frequently accessed. There are two basic types of reference locality. Temporal locality refers to the reuse of specific data and/or resources within relatively small time durations. Spatial locality refers to the use of data elements within relatively close storage locations. Sequential locality, a special case of spatial locality, occurs when data elements are arranged and accessed linearly, e.g., traversing the elements in a one-dimensional array. Locality is merely one type of predictable behavior that occurs in computer systems. Systems which exhibit strong locality of reference phenomenon are good candidates for performance optimization through the use of techniques, like the cache memory and prefetching technology concerning the memory, or like the advanced branch predictor at the pipelining of processors.

Furthermore, a cache memory must be large enough to hold a significant amount of the working set of a workload. If not, cache thrashing can occur in which multiple main memory locations compete for the same cache lines, resulting in excessive cache misses. Designing a system without a cache memory is equally problematic. Because of the tRC of DDR3 memory, the same memory location may be accessed once every 45 ns. In certain systems, such as a network packet processing system or network processor, processing logic must process a new packet in less than 7 ns. A DDR3-based memory system may not have sufficient performance if greater than 1 in 6 packets require access to a single datum (e.g., greater than once every 42 ns). Thus, there is a balance between the size of a cache memory and the cost of the cache memory.

SUMMARY OF THE DESCRIPTION

A request for reading data from a memory location of a memory is received, the memory location being identified by a physical memory address. In response to the request, a cache memory is accessed based on the physical memory address to determine whether the cache memory contains the data being requested. The entries of the cache memory are to store cache lines that have a size spanning a set of one or more physical memory addresses and that are aligned on cache line boundaries. The data associated with the request is returned from the cache memory without accessing the memory location if there is a cache hit. The data associated with the request is returned from the main memory if there is a cache miss. In response to the cache miss, it is determined whether there have been a number of accesses within a predetermined period of time to justify creation of a cache line whose span would include the physical memory address. A cache entry is allocated from the cache memory to cache the data if there have been a number of accesses within the predetermined period of time.

Other features of the present invention will be apparent from the accompanying drawings and from the detailed description which follows.

BRIEF DESCRIPTION OF THE DRAWINGS

Embodiments of the invention are illustrated by way of example and not limitation in the figures of the accompanying drawings in which like references indicate similar elements.

FIG. 4 is a flow diagram illustrating a method for accessing cache memory according to another embodiment.

DETAILED DESCRIPTION

Figure 1:
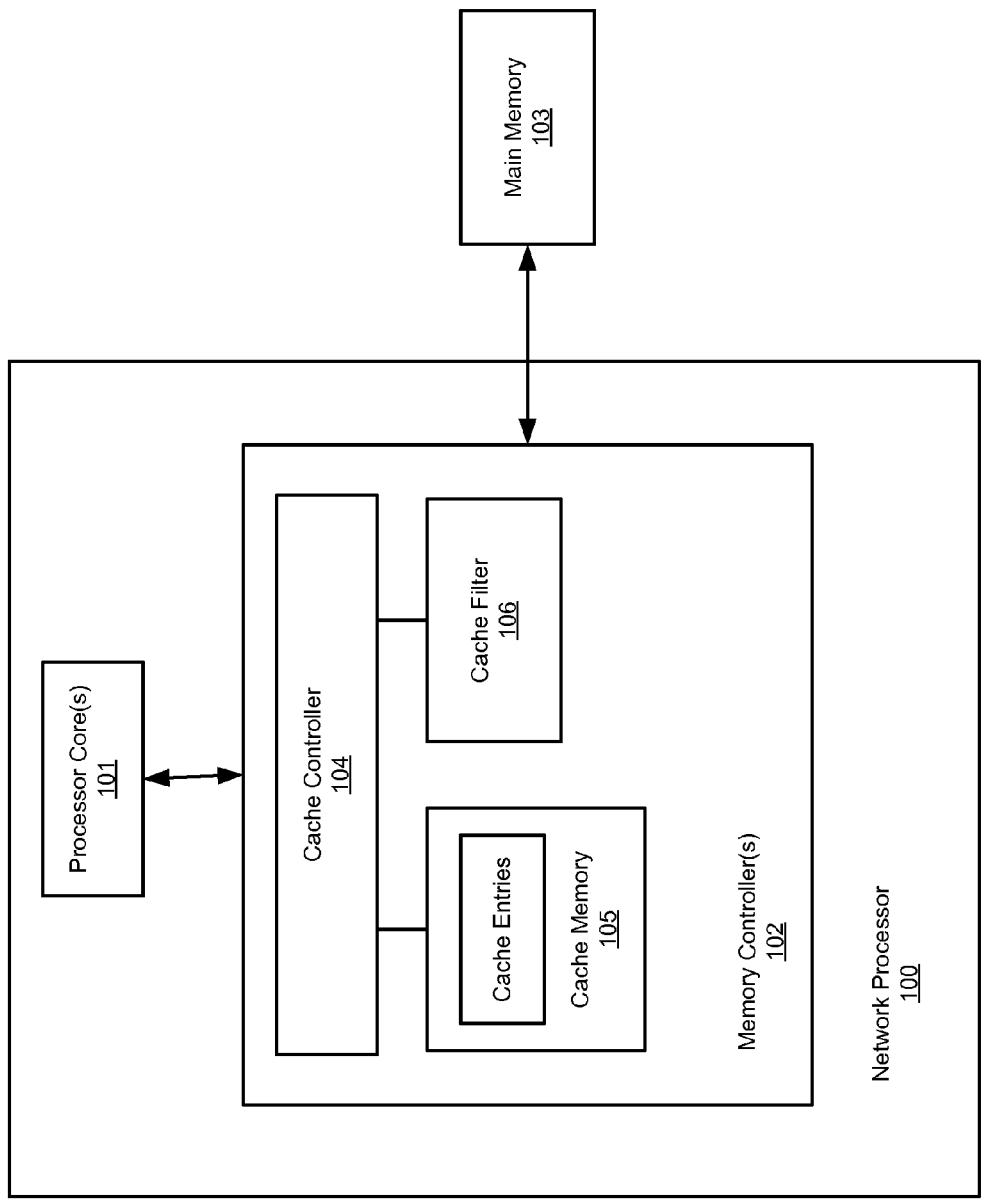
FIG. 1 is a block diagram illustrating an example of a network processor according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

According to some embodiments, a cache filter is provided to reduce or eliminate the access frequency limitations of external memory with a significantly reduced on-chip cache size. The cache filter employs a heuristic filter to determine whether or not to allocate an external memory location space in the cache memory.

In one embodiment, the cache filter is implemented as the combination of a traditional cache memory with a heuristic filter. The cache filter attempts to predict whether an external memory location will exhibit locality, and therefore should be allocated space in the cache memory. The cache filter maintains a count of the number of times an external memory location (e.g., main memory) has been accessed in the recent past. When the cache filter processes a memory access, a subset of the external memory address bits are used to index the access counts, which represent a set of one or more physical memory addresses. If the access count is non-zero or greater than a predetermined threshold, the external memory location is allocated space in the cache.

In one embodiment, the access count is incremented for every access until the count saturates at a predetermined value (e.g., 3). All access counts are periodically decremented independently according to a predetermined maintenance schedule. This is done to ensure that the access counts only reflect recent memory accesses. There are a number of algorithms that a processor can execute to cause a cache memory to replace its contents. In this embodiment, the cache memory is a traditional multi-way set associative cache memory that executes an LRU or pseudo-LRU replacement policy.

By using a cache filter to limit allocation of cache lines in the cache memory, cache-thrashing can be significantly reduced. This enables the system to use a smaller cache memory with substantial area savings. Furthermore, the associativity of the cache can be reduced which simplifies the cache memory design, saves area, and improves timing. Because the cache filter only affects the cache allocation policy, the cache design remains very traditional, and does not require any modifications to software or other system components. The cache filter is accessed in parallel with the cache's tag memory, and therefore does not increase the cache latency. The cache memory can be implemented with on-chip static RAM (SRAM). In today's technology, SRAMs can operate at speeds greater that 1 GHz. Therefore data in the cache memory can be accessed every nanosecond, which is a 45-time improvement compared to external DDR3 memory.

FIG. 1 is a block diagram illustrating an example of a network processor according to one embodiment of the invention. For example, system 100 may be a part of packet processing logic of a network element. Referring to FIG. 1, system 100 includes, but not limited to, one or more processors or processor cores 101 coupled to memory 103 (e.g., main memory) via one or more memory controllers 102. Processor 101 and memory controller 102 may be implemented in a single chip or separate chips. Processor(s) 101 may be implemented as multiple execution units of a multi-threaded processor. In one embodiment, memory controller 102 includes, but is not limited to, cache memory 105 and cache filter 106 controlled by cache controller 104.

Processor 101 may be a network processor (also referred to as a packet processor). A network processor may be an integrated circuit (IC), such as an application specific IC (ASIC), which has a feature set specifically targeted at the networking application domain. Network processors are typically software programmable devices and would have generic characteristics similar to general purpose central processing units (CPUs) that are commonly used in many different types of equipment and products. A network processor may include multiple processors, processor cores, execution units, and/or functional units, which may be used in a variety of architectural paradigms, such as pipeline of processors, parallel processing, and/or specialized microcoded engines.

Cache memory 105 is used to cache data of one or more memory locations of memory 103 accessed (e.g., read or write) by processor 101, so that data of subsequent access to the same memory locations can be obtained from the cache memory 105 without accessing the memory again. A cache memory is a smaller, faster memory which stores copies of data from the most frequently used main memory (e.g., memory 103) locations. As long as most memory accesses are cached memory locations, the average latency of memory accesses will be closer to the cache latency than to the latency of the main memory. When processor 101 needs to read from or write to a location in memory 103, it first checks whether a copy of that data is in cache memory 105. If so, processor 101 reads from or writes to cache memory 105, which is much faster than reading from or writing to memory 103. The entries of cache memory 105 are used to store cache lines that have a size spanning a set of one or more physical memory addresses and that are aligned on cache line boundaries.

In one embodiment, cache filter 106 attempts to predict whether or not an external memory location (e.g., main memory) will exhibit locality, and therefore should be allocated space in cache memory 105. The cache filter 106 maintains a count of the number of times an external memory location (e.g., main memory) has been accessed in the recent past (e.g., within a predetermined period of time). When cache filter 106 processes a memory access, a subset of the external memory address bits are used to index the access counts. If the access count is non-zero or greater than a predetermined threshold, a cache line is allocated in cache memory 105 for the external memory location. That is, cache filter 106 is configured to determine whether there has been a number of accesses to a set of one or more physical memory addresses of the main memory for the past predetermined period of time, to justify creation of a cache line whose span would include a particular physical memory address corresponding to the memory location being accessed. As a result, cache memory 105 can be maintained in a relatively small size while providing a sufficient enough cache for processing data.

Figure 2:
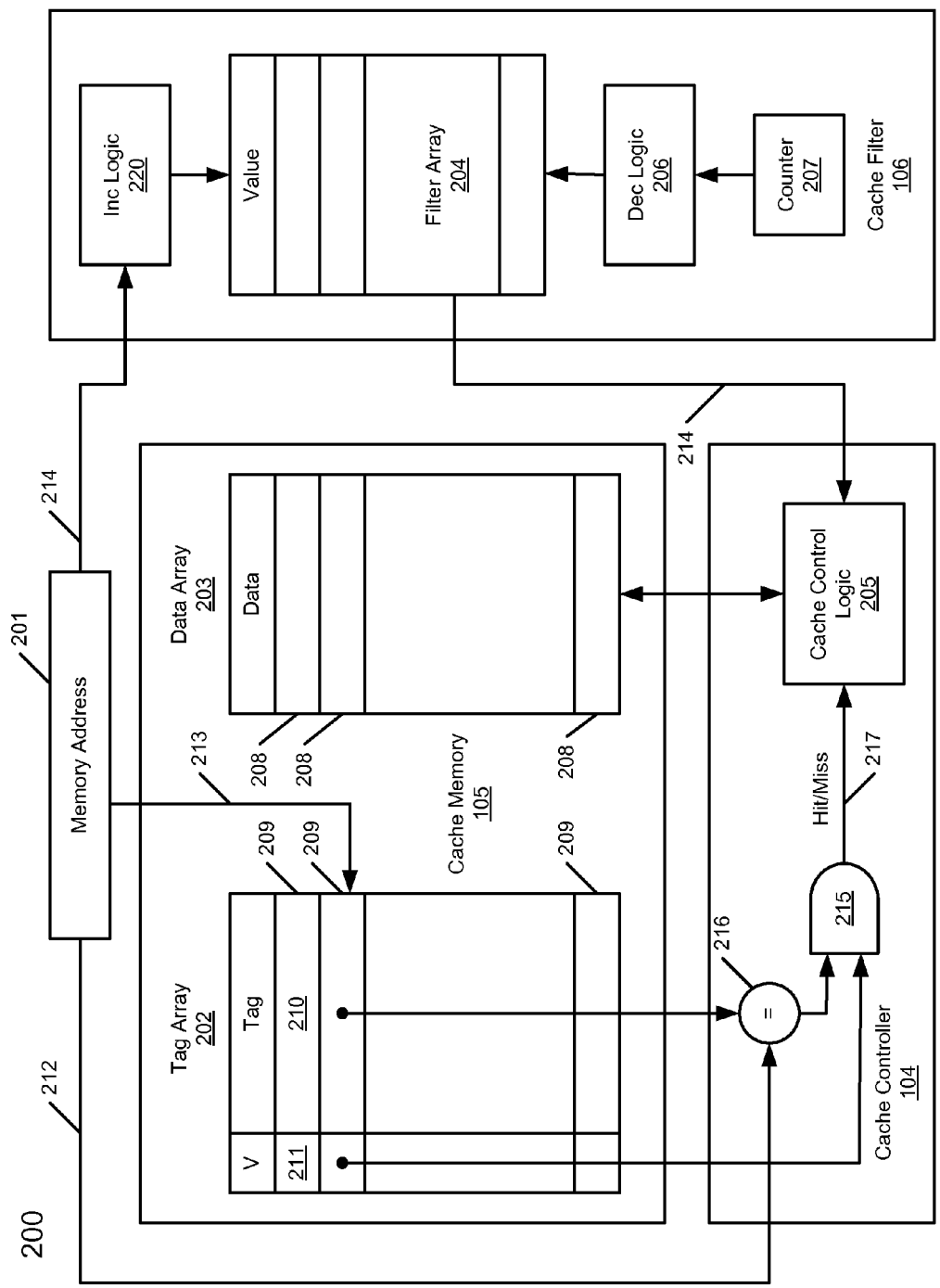
FIG. 2 is a block diagram illustrating a cache system according to one embodiment of the invention.

FIG. 2 is a block diagram illustrating a cache system according to one embodiment of the invention. Referring to FIG. 2, cache system 200 includes, cache memory having tag array 202 and data array 203, and a cache filter having filter array 204. Tag array 202, data array 203, and filter array 204 may be implemented as part of cache memory 105 and cache filter 106 of FIG. 1. Data array 203 includes multiple cache lines 208 for storing data. Associated with each of cache lines 208 is a tag line 209 within tag array or directory 202. Each of tag lines 209 contains two portions. The first portion is TAG 210 which contains a subset of external memory address bits for data which is stored in the associated cache line 208. The second portion is valid bit 211 which is used to indicate whether the data which is stored in the associated cache line 208 is valid. The valid bit indicates that the data in the cache memory is the most up-to-date copy of the data. The data in memory may or may not be the same. If it is not the same, the data in the cache memory is valid and the data in memory is stale.

Above the data array 203 is shown physical memory address 201 (e.g., 32-bit physical memory address). Physical memory address 201 may be transmitted to cache memory system 200 via an address bus. Physical memory address 201 can be used to derive two portions. The first portion is tag 212 which is used to specify a block in main memory which contains the desired data. The second portion is index 213. Index 213 is typically a subset of the lower bits of physical memory address 201. Index 213 is used to specify the particular set within the cache. Thus, index 213 is used to select a particular tag line 209 within tag array 202. Valid bit 211 of the indexed tag line 209 is provided as an input to AND gate 215. Tag 210 of the indexed tag line 209 is provided as an input to comparator 216. Tag 212 is also provided as in input to comparator 216.

As physical memory address 201 is provided to cache memory system 200, index 213 selects tag line 209 via a bus. Tag 210 from the indexed tag line 209 is provided to comparator 216 along with Tag 212. If Tag 212 is the same as tag 210, then comparator 216 provides an output to AND gate 215 to indicate that the associated cache line 208 in data array 203 contains the desired data. If valid bit 211 of the indexed tag line indicates the data is valid, then AND gate 215 provides a cache hit output on signal line 217; otherwise, AND gate 215 provides a cache miss output on signal line 217. The cache hit signal releases the data in the cache line 208 associated with the indexed tag line, via cache control logic 205.

According to one embodiment, cache system 200 further includes a filter array 204 having multiple entries, which is indexed by a portion of a physical memory address that has been accessed. Each entry of filter array 204 is used to store data indicating how frequent a set of one or more physical memory addresses have been accessed (e.g., read or write). In one embodiment, each of entries in filter array 204 includes a count value indicating a number of times that a particular memory location has been accessed within a predetermined period of time.

In one embodiment, when AND gate 215 produces a cache hit/miss signal at signal line 217, increment logic 220 may access an entry of filter array 204 corresponding to the memory location being accessed based on portion 214 of the corresponding physical memory address 201 to increment the value of the corresponding entry. That is, the value of the corresponding entry is incremented whenever any one of the corresponding set of physical memory addresses has been accessed, regardless whether there is a cache hit or a cache miss.

In addition, if there is a cache miss, cache control logic 205 is configured to determine whether the value of the corresponding entry in filter array 204 reaches a predetermined threshold. If so, a cache entry is allocated from cache tag array 202 and data array 203 for a cache line that includes the corresponding physical memory address; otherwise, the data is not cached in the cache memory because the corresponding memory location has not been accessed frequently enough. The predetermined threshold can be statically configured ahead of time or alternatively, be dynamically programmed via an application programmable interface (API).

Meanwhile, according to one embodiment, decrement logic 206 is configured to independently decrement the value of each entry of filter array 204 according to a predetermined schedule. In one embodiment, decrement logic 206 is configured to scan each entry of filter array 204 for every predetermined number of processing or clock cycles, such as, for example, 4095 cycles, supplied by timer or counter logic 207. That is, whenever an access is made to a memory location, increment logic 220 is configured to increment the value of an entry in filter array corresponding to the memory location. Independently and/or in parallel, decrement logic 206 is configured to decrement the value of the entry according to a predetermined scanning schedule. Note that increment logic 220 and decrement logic 206 may be implemented as a single logic.

Whenever there is a cache miss of a particular memory address, cache control logic 205 is configured to determine whether the value of an entry corresponding to that particular memory address reaches a predetermined threshold to justify creation of a cache line whose span would include the physical memory address. If so, a cache entry is allocated from tag array 202 and data array 203 for caching the data of that particular memory location; otherwise, the cache entry will not be allocated. If the cache memory is full, a replacement policy, such as least recently used (LRU) algorithm, may be used to evict another entry from the cache memory for storing the new data.

In one embodiment, each entry of filter array 204 includes a single bit field to store a value representing a number of accesses of the corresponding set of one or more physical memory addresses within a predetermined period of time to justify creation of a cache line whose span would include the physical memory address. Whenever there is an attempt to access any one of the set of one or more physical memory addresses, the corresponding entry in filter array 204 is incremented, for example, by increment logic 220. For example, if the current value of the corresponding single bit is a logical value of zero, the value will be incremented to a logical value of one. In one embodiment, such an increment is a saturated increment in which if the current value is logical one, an increment of the value will remain logical one. Similarly, when decrement logic 206 decrements an entry of filter array 204, if the current value of the entry is logical zero, a decrement of the value remains logical zero (e.g., saturated decrement).

Since only a single bit is used to represent a memory location, filter array 204 can be used to represent many memory locations. In one embodiment, the cache memory may be implemented in an 8 Kbyte and 4-way set-associative cache with 64 bytes per block configuration. Filter array 204 may include 32 Kbits. In one embodiment, index 213 is formed based on bits [10:6] (e.g., from bit 6 to bit 10) of physical memory address 201 while index 214 to filter array 204 may be formed based on bits [20:6] (e.g., from bit 6 to bit 20) of physical memory address 201, where index 214 represent a set of one or more physical memory addresses.

Figure 3:
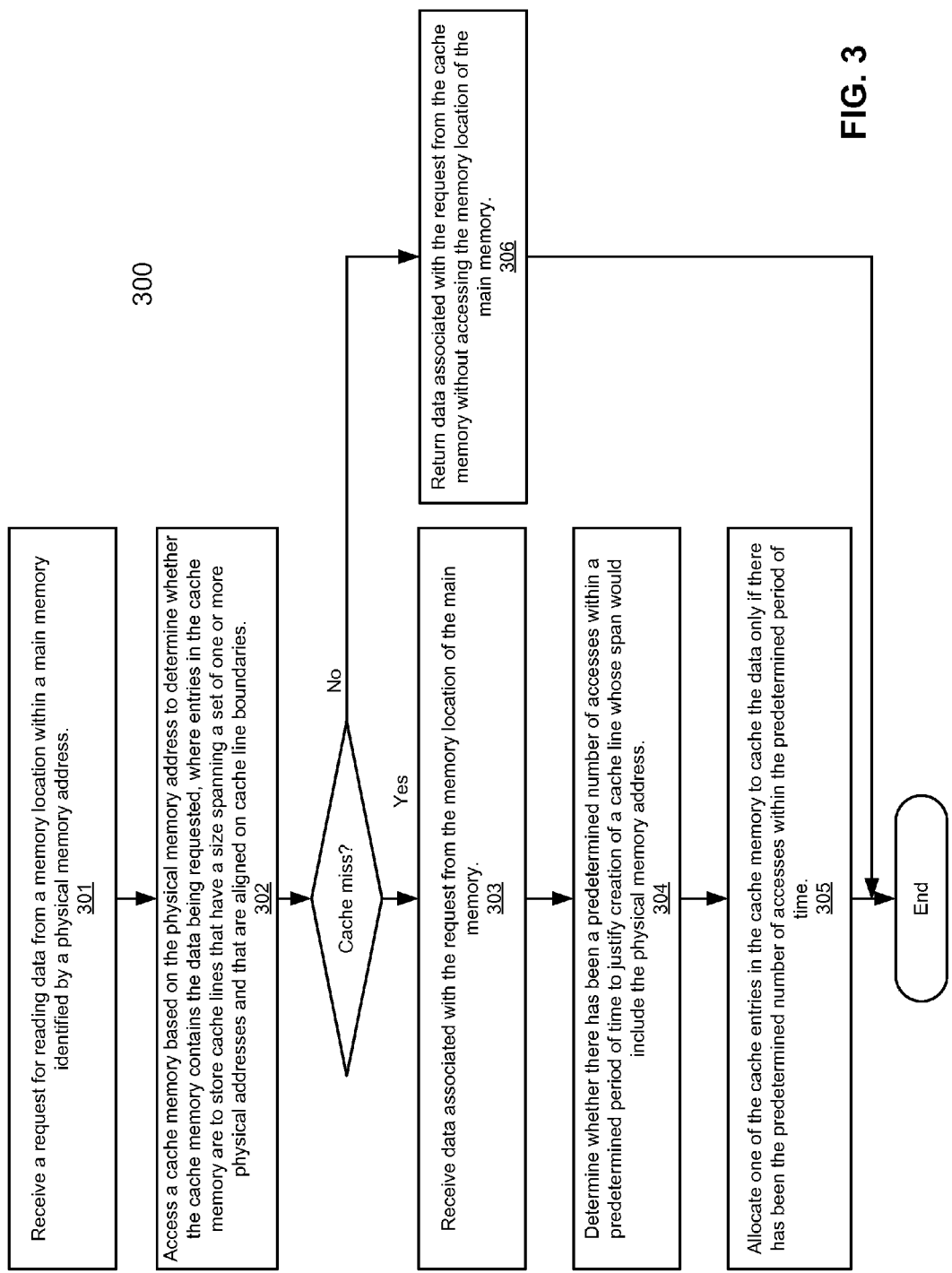
FIG. 3 is a flow diagram illustrating a method for accessing cache memory according to one embodiment.

FIG. 3 is a flow diagram illustrating a method for accessing cache memory according to one embodiment. Method 300 may be performed by system 200 of FIG. 2. Referring to FIG. 3, at block 301, a request is received for reading data from a memory location of a memory (e.g., main memory) identified by a physical memory address. In response to the request, at block 302, processing logic accesses a cache memory based on the physical memory address to determine whether the cache memory contains the data being requested (e.g., cache hit), where entries in the cache memory are to store cache lines that have a size spanning a set of one or more physical memory addresses and that are aligned on cache line boundaries. If there is a cache hit, at block 306, processing logic returns data associated with the request from the cache memory without accessing the memory location of the memory. If there is a cache miss, at block 303, processing logic receives data associated with the request from the memory location and returns the data to a client (e.g., a process) that issues the request. In addition, at block 304, it is determined whether there have been a number of accesses within a predetermined period of time to justify creation of a cache line whose span would include the physical memory address. If so, at block 305, a cache entry is allocated from the cache memory to cache the data being read.

FIG. 4 is a flow diagram illustrating a method for accessing cache memory according to another embodiment. For example, the method as shown in FIG. 4 may be performed as part of block 304 of FIG. 3. Referring to FIG. 4, at block 304, a value of a first of multiple entries of a filter array is incremented. Each of the entries is currently associated with one or more recently accessed physical memory addresses. The first entry is associated with the physical memory address. The value represents a number of times the memory address has been accessed within a period of time for the purpose of allocating a cache entry.

Figure 5:
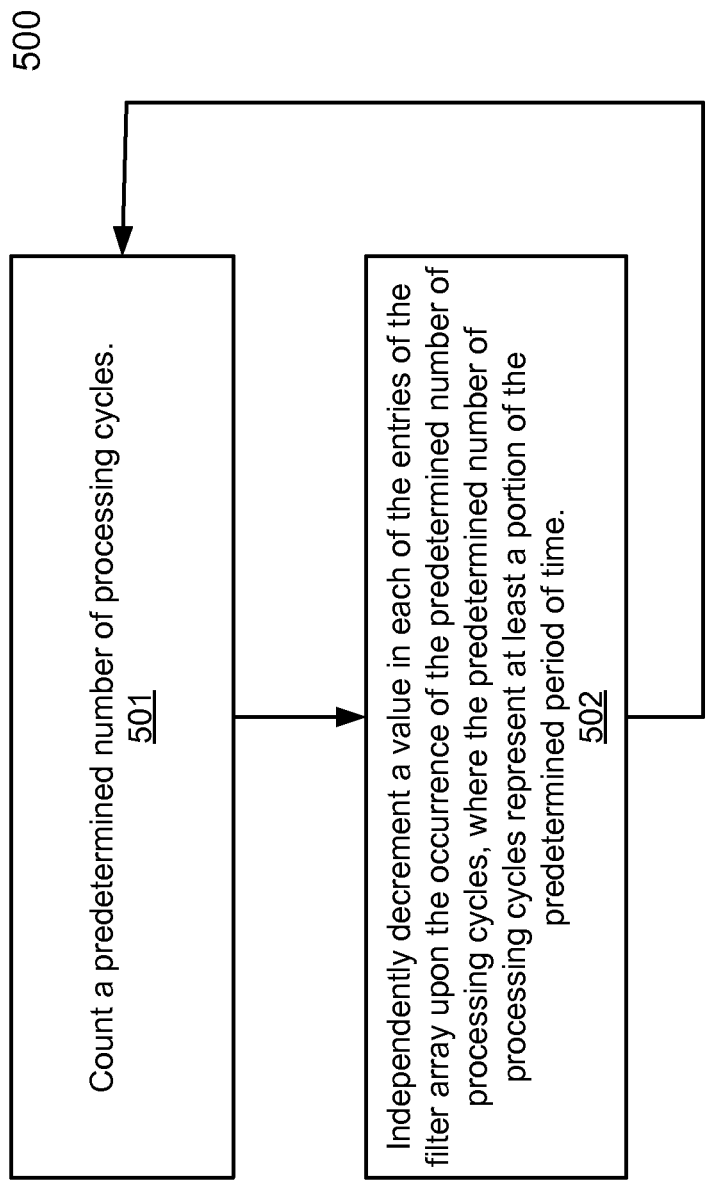
FIG. 5 is a flow diagram illustrating a method for accessing cache memory according to another embodiment.

FIG. 5 is a flow diagram illustrating a method for accessing cache memory according to another embodiment. For example, method 500 may be performed independently with respect to method 300 of FIG. 3. Referring to FIG. 5, at block 501, processing logic counts a predetermined number of processing cycles (e.g., clock cycles). In one embodiment, a timer or counter may be utilized for counting the processing cycles. At block 502, processing logic independently decrements a value in each of the entries of the filter array upon the occurrence of the predetermined number of processing cycles (e.g., 4095 cycles), where the predetermined number of processing cycles represent at least a portion of the predetermined period of time. The value in each entry can be used to determine whether a cache entry should be allocated as described above.

Figure 6:
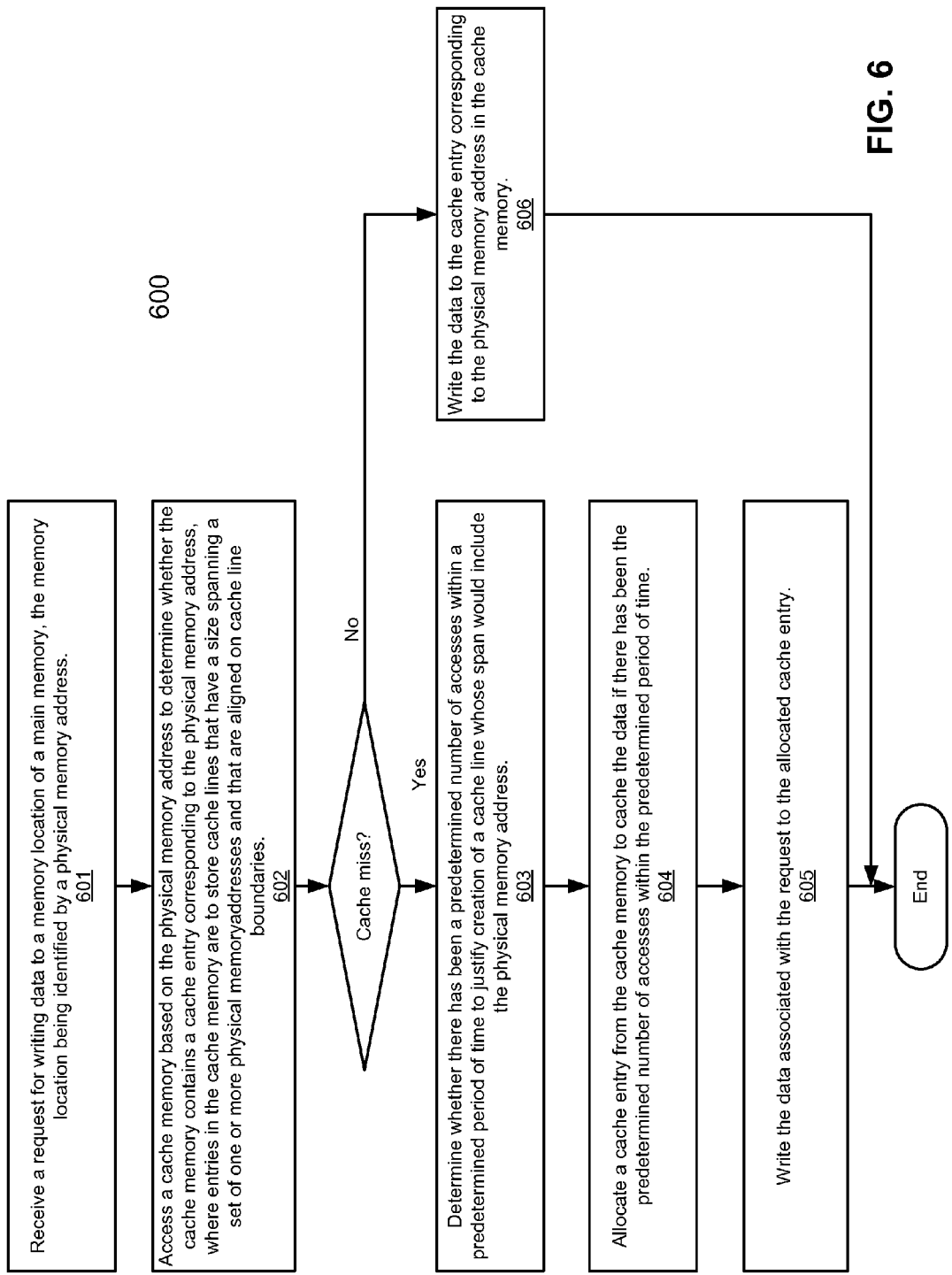
FIG. 6 is a flow diagram illustrating a method for accessing cache memory according to another embodiment.

FIG. 6 is a flow diagram illustrating a method for accessing cache memory according to another embodiment. Referring to FIG. 6, at block 601, a request is received for writing data to a memory location of a memory (e.g., main memory) identified by a physical memory address. At block 602, a cache memory is accessed based on the physical memory address to determine whether the cache memory contains an entry associated with the physical memory address (e.g., cache hit or cache miss), where entries of the cache memory are to store cache lines that have a size spanning a set of one or more physical memory addresses and that are aligned on cache line boundaries. If there is a cache hit, at block 606, data is written to the cache entry associated with the request in the cache memory. If there is a cache miss, at block 603, it is determined whether there have been a predetermined number of accesses within a predetermined period of time to justify creation of a cache line whose span would include the physical memory address. If so, at block 604, a cache entry is allocated from the cache memory to cache the data if there has been the predetermined number of accesses within the predetermined period of time. At block 605, the data associated with the request is written to the allocated cache entry.

Note that the cache memory may be implemented as a write through cache or a write back cache. In the write through cache design, the data is written to the cache memory and immediately written to the memory as well. In the write back design, the data is written to the cache memory without immediately writing to the memory. The data is written to the memory when the corresponding cache entry is evicted. Any change prior to the eviction would not be written to the memory until the eviction occurs.

Figure 7:
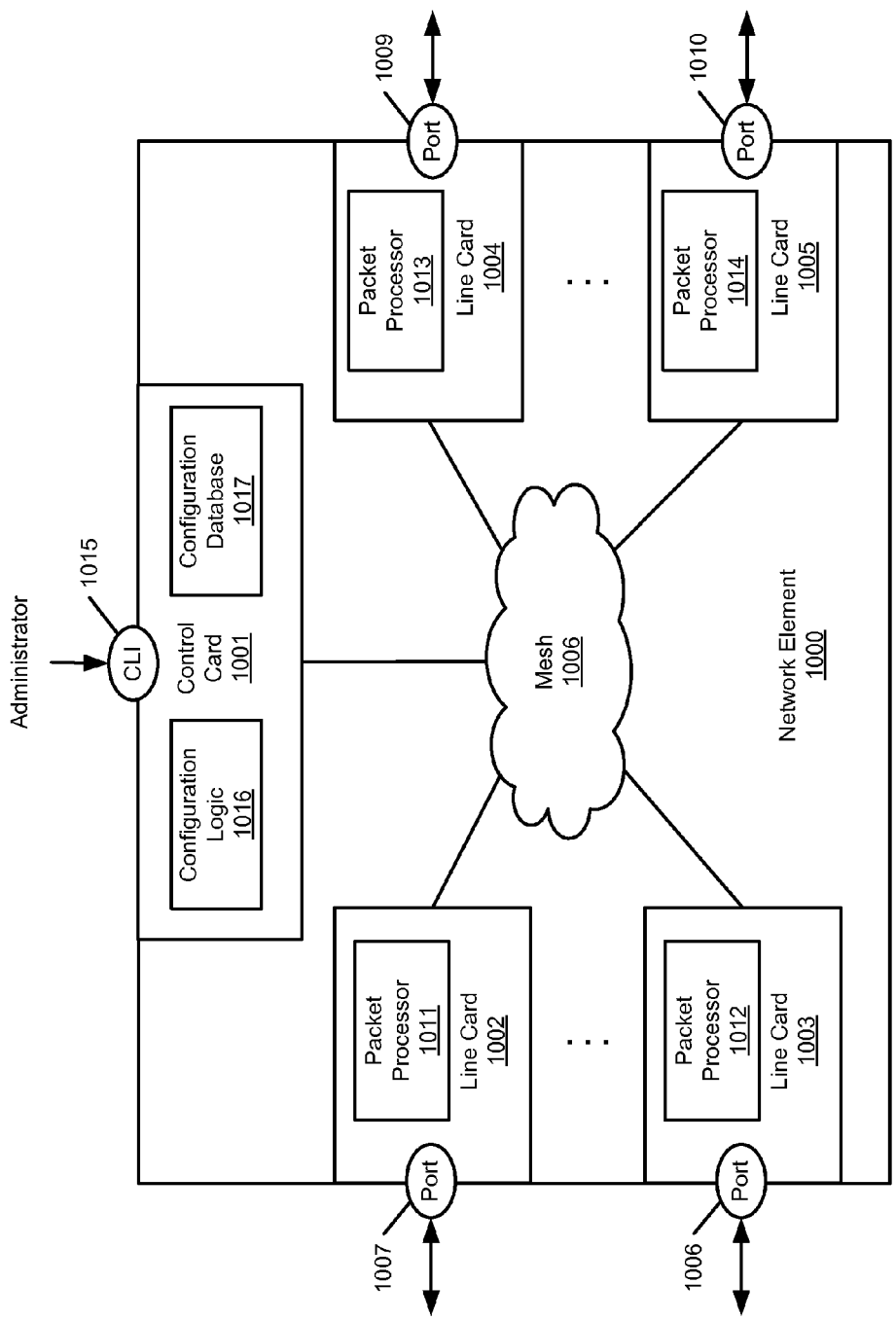
FIG. 7 is a block diagram illustrating a network element according to one embodiment of the invention.

FIG. 7 is a block diagram illustrating a network element 1000 according to one embodiment of the invention. At least one of the line cards 1002-1005 may include a packet processing device having a cache mechanism described above. In one embodiment, network element 1000 includes, but is not limited to, a control card 1001 (also referred to as a control plane) communicatively coupled to one or more line cards 1002-1005 (also referred to as interface cards or user planes) over a mesh 1006, which may be a mesh network, an interconnect, a bus, or a combination thereof. A line card is also referred to as a data plane (sometimes referred to as a forwarding plane or a media plane). Each of the line cards 1002-1005 is associated with one or more interfaces (also referred to as ports), such as interfaces 1007-1010 respectively. Each line card includes a network processor (also referred to as a packet processor, routing functional block or logic (e.g., blocks 1011-1014) to route and/or forward packets via the corresponding interface according to a configuration (e.g., routing table) configured by control card 1001, which may be configured by an administrator via an interface 1015 (e.g., a command line interface or CLI). According to one embodiment, control card 1001 includes, but is not limited to, configuration logic 1016 and database 1017 for storing information configured by configuration logic 1016.

In the case that network element 1000 is a router (or is implementing routing functionality), control plane 1001 typically determines how data (e.g., packets) is to be routed (e.g., the next hop for the data and the outgoing port for that data), and the data plane (e.g., lines cards 1002-1003) is in charge of forwarding that data. For example, control plane 1001 typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics.

Routes and adjacencies are stored in one or more routing structures (e.g., Routing Information Base (RIB), Label Information Base (LIB), and one or more adjacency structures) on the control plane (e.g., database 1008). Control plane 1001 programs the data plane (e.g., line cards 1002-1003) with information (e.g., adjacency and route information) based on the routing structure(s). For example, control plane 1001 programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main routing information base (RIB) based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols. For layer 2 forwarding, the network element 1000 can store one or more bridging tables that are used to forward data based on the layer 2 information in this data.

Typically, a network element may include a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (e.g., GGSN, Evolved Packet System (EPS) Gateway). By way of example, a service card may be used to terminate IPsec tunnels and execute the attendant authentication and encryption algorithms. As used herein, a network element (e.g., a router, switch, bridge) is a piece of networking equipment, including hardware and software, that communicatively interconnects other equipment on the network (e.g., other network elements, end stations, terminals). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video).

Subscriber end stations (e.g., servers, workstations, laptops, netbooks, palm tops, mobile phones, smart phones, multimedia phones, Voice Over Internet Protocol (VoIP) phones, user equipment, terminals, portable media players, global positioning system (GPS) units, gaming systems, set-top boxes) access content/services provided over the Internet and/or content/services provided on virtual private networks (VPNs) tunneled through the Internet. The content and/or services are typically provided by one or more end stations (e.g., server end stations) belonging to a service or content provider or end stations participating in a peer to peer service, and may include public Web pages (e.g., free content, store fronts, search services), private Web pages (e.g., username/password accessed Web pages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Note that network element 1000 is described for the purpose of illustration only. More or fewer components may be implemented dependent upon a specific application. For example, although a single control card is shown, multiple control cards may be implemented, for example, for the purpose of redundancy. Similarly, multiple line cards may also be implemented on each of the ingress and egress interfaces. Also note that some or all of the components as shown may be implemented in hardware, software (embodied on a non-transitory computer readable medium), or a combination of both.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine-implemented method in a cache system of a memory controller of a network processor in a network element to avoid caching data identified by physical memory addresses that have not been accessed frequently in a recent period of time, the method comprising the steps of:
   receiving a request for reading data from a memory location within a main memory identified by a physical memory address;
   in response to the request, accessing a cache memory based on the physical memory address to determine whether the cache memory contains the data being requested, wherein entries in the cache memory are to store cache lines that have a size spanning a set of one or more physical memory addresses and that are aligned on cache line boundaries;
   incrementing, in a filter array comprising a plurality of entries that each include a value, the value of a first entry, by one count, wherein each of the plurality of entries is currently associated with one or more recently accessed physical memory addresses, wherein each of the plurality of entries can store a value larger than one, and wherein the first entry is associated with the physical memory address;
   returning the data associated with the request from the cache memory without accessing the memory location of the main memory if there is a cache hit; and
   in response to a cache miss, performing the following steps:
      receiving the data associated with the request from the main memory,
      determining whether the value of the first entry of the filter array reaches a predetermined threshold, and
      allocating one of the entries in the cache memory to cache the data only if the value of the first entry has reached the predetermined threshold; and
   decrementing, upon an occurrence of a predetermined number of processing cycles, the value of each of the plurality of entries of the filter array by one count, such that the value of each of the plurality of entries represents a number of accesses of corresponding physical memory locations wherein each value decays by one count upon a set period of time represented by the predetermined number of processing cycles.

2. The method of claim 1, wherein the values of the entries in the filter array represent a number of recent accesses to the physical memory addresses currently associated with the entry.

3. The method of claim 1, wherein each of the entries in the filter array is indexed based on a portion of the currently associated physical memory address.

4. The method of claim 1, further comprising the steps of:
   receiving a second request for writing second data to a second memory location in the main memory identified by a second physical memory address;
   incrementing a value of a second entry in the filter array, wherein the second entry is associated with the second physical memory address;
   determining whether the cache memory contains a cache entry corresponding to the second physical memory address;
   in response to a cache miss, performing the following steps:
      determining whether the value of the second entry of the filter array reaches the predetermined threshold, and
      if the value of the second entry has reached the predetermined threshold to justify creation of a cache line whose span would include the second physical memory address, then performing the steps of:
         allocating a cache entry from the cache memory to cache the data; and
         writing the data associated with the request to the allocated cache entry.

5. The method of claim 1, wherein each of the plurality of entries in the filter array is at least two bits in size.

6. A machine-implemented method in a cache system of a memory controller of a network processor in a network element to avoid caching data identified by physical memory addresses that have not been accessed frequently in a recent period of time, the method comprising the steps of:
   receiving a request for writing data to a memory location within a main memory identified by a physical memory address;
   incrementing, in a filter array comprising a plurality of entries that each include a value, the value of a first entry, by one count, wherein each of the plurality of entries is currently associated with one or more recently accessed physical memory addresses, wherein each of the plurality of entries can store a value larger than one, and wherein the first entry is associated with the physical memory address;
   in response to the request, accessing a cache memory based on the physical memory address to determine whether the cache memory contains a cache entry corresponding to the physical memory address, wherein entries in the cache memory are to store cache lines that have a size spanning a set of one or more physical memory addresses and that are aligned on cache line boundaries;
   writing the data to the cache entry corresponding to the physical memory address in the cache memory if there is a cache hit; and
   in response to a cache miss, performing the following steps:
      determining whether the value of the first entry of the filter array reaches a predetermined threshold, and
      if the value of the first entry has reached the predetermined threshold to justify creation of a cache line whose span would include the physical memory address, then performing the steps of:
         allocating a cache entry from the cache memory to cache the data; and
         writing the data associated with the request to the allocated cache entry; and
   decrementing, upon an occurrence of a predetermined number of processing cycles, the value of each of the plurality of entries of the filter array by one count, such that the value of each of the plurality of entries represents a number of accesses of corresponding physical memory locations wherein each value decays by one count upon a set period of time represented by the predetermined number of processing cycles.

7. The method of claim 6, wherein the values of the entries of the filter array represent a number of recent accesses to the physical memory addresses currently associated with the entry.

8. The machine-implemented method of claim 6, wherein each of the plurality of entries in the filter array is at least two bits in size.

9. A network processor, comprising:
one or more processor cores; and
a memory controller coupled to the one or more processor cores, the memory controller including,
   a cache memory having a plurality of cache entries, wherein the entries in the cache memory are to store cache lines that have a size spanning a set of one or more physical memory addresses and that are aligned on cache line boundaries,
   a cache controller, coupled to the cache memory, configured to receive read requests from the one or more processor cores for data associated with physical addresses, detect cache hits and cache misses in the cache memory, and respond with the requested data from the cache memory on cache hits and from a main memory on cache misses,
   a cache filter, coupled to the cache controller, configured to determine for each cache miss, whether the value of an entry of a filter array that is associated with the requested physical memory address reaches a predetermined threshold to justify creation of a cache line whose span would include the requested physical memory address, the cache filter comprising,
      the filter array having a plurality of entries, each entry including a value and being currently associated with one or more recently accessed physical memory addresses, wherein each of the plurality of entries can store a value larger than one,
      an increment logic coupled to the filter array to increment, for each of the received requests, the value in the filter array entry associated with the requested physical memory address by one count,
      a counter for continuously counting a predetermined number of processing cycles, and
      a decrement logic coupled to the counter to independently decrement the value in each of the entries of the filter array upon the occurrence of the predetermined number of processing cycles by one count, such that the value of each of the plurality of entries represents a number of accesses of corresponding physical memory locations wherein each value decays by one count upon a set period of time represented by the predetermined number of processing cycles, and
   wherein the cache controller is configured to allocate, for each cache miss, one of the cache entries only if there have been the predetermined number of accesses within the predetermined period of time.

10. The processor of claim 9, wherein the values of the entries in the filter array represent a number of recent accesses to the currently associated physical memory addresses.

11. The processor of claim 9, wherein the cache controller is also configured to:
receive write requests;
write to the cache memory on cache hits; and
allocate entries in the cache memory only if the value of the entry of the filter array that is associated with the requested physical memory addresses to be written to reaches the predetermined threshold.

12. The network processor of claim 9, wherein each of the plurality of entries in the filter array is at least two bits in size.

* * * * *

UNITED STATES PATENT AND TRADEMARK OFFICE
CERTIFICATE OF CORRECTION

PATENT NO. : 8,914,581 B2
APPLICATION NO. : 12/784276
DATED : December 16, 2014
INVENTOR(S) : Hathaway et al.

Page 1 of 1

It is certified that error appears in the above-identified patent and that said Letters Patent is hereby corrected as shown below:

In the specification,

In Column 9, Line 48, delete "services" and insert -- services) --, therefor.

In the claims,

In Column 12, Line 64, in Claim 7, delete "The method" and insert -- The machine-implemented method --, therefor.

In Column 14, Line 19, in Claim 10, delete "The processor" and insert -- The network processor --, therefor.

In Column 14, Line 22, in Claim 11, delete "The processor" and insert -- The network processor --, therefor.

Signed and Sealed this
Sixteenth Day of August, 2016

Michelle K. Lee
*Director of the United States Patent and Trademark Office*